(12) United States Patent
Gai et al.

(10) Patent No.: US 11,749,467 B2
(45) Date of Patent: Sep. 5, 2023

(54) CARBON CLOTH/GALLIUM OXYNITRIDE AND WORKING ELECTRODE AND SUPERCAPACITOR THEREOF

(71) Applicant: QILU UNIVERSITY OF TECHNOLOGY, Jinan (CN)

(72) Inventors: Ligang Gai, Jinan (CN); Qing Ban, Jinan (CN); Jiayu Wang, Jinan (CN); Haihui Jiang, Jinan (CN); Libin Liu, Jinan (CN)

(73) Assignee: QILU UNIVERSITY OF TECHNOLOGY, Jinan (CN)

( * ) Notice: Subject to any disclaimer, the term of this patent is extended or adjusted under 35 U.S.C. 154(b) by 91 days.

(21) Appl. No.: 17/453,466

(22) Filed: Nov. 3, 2021

(65) Prior Publication Data

US 2022/0139638 A1    May 5, 2022

Related U.S. Application Data

(63) Continuation of application No. PCT/CN2020/138320, filed on Dec. 22, 2020.

(51) Int. Cl.
| | |
|---|---|
| *H01G 11/32* | (2013.01) |
| *C01G 15/00* | (2006.01) |
| *H01G 11/52* | (2013.01) |
| *H01G 11/26* | (2013.01) |
| *H01G 11/60* | (2013.01) |

(52) U.S. Cl.
CPC ............. *H01G 11/32* (2013.01); *C01G 15/00* (2013.01); *H01G 11/26* (2013.01); *H01G 11/52* (2013.01); *H01G 11/60* (2013.01); *C01P 2002/74* (2013.01)

(58) Field of Classification Search
CPC ........ H01G 11/32; H01G 11/26; H01G 11/52; H01G 11/60; C01G 15/00; C01P 2002/74
See application file for complete search history.

(56) References Cited

U.S. PATENT DOCUMENTS

2022/0139638 A1*   5/2022   Gai ................. H01G 11/52
                                                                  361/505

FOREIGN PATENT DOCUMENTS

| CN | 112309723 A | * | 2/2021 | ............. C01G 15/00 |
| WO | WO-2022088450 A1 | * | 5/2022 | ............. C01G 15/00 |

* cited by examiner

*Primary Examiner* — Dion R. Ferguson
(74) *Attorney, Agent, or Firm* — CBM Patent Consulting, LLC (57) ABSTRACT

A carbon cloth/gallium oxynitride has a chemical formula of $GaO_xN_y$, where $x=0.1-0.3$ and $y=0.7-0.9$; and has a N/O molar ratio of 2.3 to 9. The carbon cloth/gallium oxynitride is a composite formed by loading gallium oxynitride nanoparticles on carbon cloth fibers, wherein the gallium oxynitride nanoparticles have a size range of 10 to 70 nm, and the carbon cloth/gallium oxynitride has a discharge specific capacitance of 30 to 865 mF $cm^{-2}$ at current densities ranging from 0.5 to 100 mA $cm^{-2}$. The working electrode is made from the carbon cloth/gallium oxynitride; and the supercapacitor is composed of the carbon cloth/gallium oxynitride working electrodes, a separator, an electrolyte, and an outer package.

20 Claims, 10 Drawing Sheets

CARBON CLOTH/GALLIUM OXYNITRIDE AND WORKING ELECTRODE AND SUPERCAPACITOR THEREOF

CROSS-REFERENCE TO RELATED APPLICATIONS

This application is a continuation application of PCT/CN2020/138320 filed on 22 Dec. 2020 that claims the priority of CN2020111764512 filed 29 October, entitled "Carbon cloth/gallium oxynitride-based working electrode and supercapacitor".

FIELD OF THE INVENTION

The present disclosure belongs to the technical field of electrochemical energy storage, relates to an electrochemical working electrode and a supercapacitor and preparation methods thereof, and in particular to a carbon cloth/gallium oxynitride-based working electrode and supercapacitor and preparation methods thereof.

BACKGROUND OF THE INVENTION

Supercapacitors are devices that store energy through an interfacial double-layer capacitance formed between an electrode and an electrolyte. A supercapacitor is composed of two electrodes, an electrolyte, a separator, and an outer package. When electrodes contact the electrolyte, under the action of Coulombic force, intermolecular force, interatomic force, and interionic force, two layers of stable charges with opposite signs will appear at solid-liquid interfaces, so the charges are called interfacial double-layer charge. When an electric potential was applied, the positive electrode attracts negative ions in the electrolyte, and the negative electrode attracts positive ions, thereby forming electrochemical double-layer capacitance on the surface of two electrodes.

According to the electrode materials, the supercapacitors can be classified into carbon-, metal oxide-, metal nitride-, and polymer-based supercapacitors, etc. According to the electrolyte, the supercapacitors can be classified into organic electrolyte- and aqueous electrolyte-based supercapacitors. According to the energy-storage mechanism of the two electrodes, the supercapacitors can be classified into symmetric and asymmetric (also known as hybrid) supercapacitors.

Supercapacitors are a type of electrochemical energy storage devices that bridge the conventional electrolytic capacitors and the batteries. Supercapacitors manifest relatively high specific capacitance compared with the electrolytic capacitors, while exhibit relatively high power density and rate capability yet relatively low energy density compared with the batteries.

Recently, researchers have found that gallium nitride shows excellent rate capability when used as an electrode material for supercapacitors; however, gallium nitride manifests relatively low specific capacitance (*Adv. Mater.* 2016, 28, 3768-3776).

By replacing partial nitrogen atoms in gallium nitride with oxygen atoms, a novel semiconductor material, i.e. gallium oxynitride, can be obtained. Although gallium oxynitride is semiconducting, its electrical conductivity is not high. Such a situation will affect the rate capability of gallium oxynitride-based supercapacitors.

SUMMARY OF THE INVENTION

In view of the deficiencies of the prior art, the present disclosure provides a carbon cloth/gallium oxynitride and a preparation method and application thereof. The composite material has relatively high specific capacitance and rate capability when used as an electrode material for supercapacitors.

The present disclosure provides a carbon cloth/gallium oxynitride-based working electrode and supercapacitor and preparation methods thereof. The working electrode and the supercapacitor have excellent specific capacitance and rate capability.

A carbon cloth/gallium oxynitride has a chemical formula of $GaO_xN_y$, where $x=0.1$-$0.3$ and $y=0.7$-$0.9$. The carbon cloth/gallium oxynitride has a N/O molar ratio of 2.3 to 9, and preferably has the N/O molar ratio of 4 to 5.

The carbon cloth/gallium oxynitride is a composite formed by loading gallium oxynitride nanoparticles on carbon cloth fibers. The gallium oxynitride nanoparticles have a size range of 10 to 70 nm, and preferably have the size range of 10 to 25 nm, referring to FIG. 7 to FIG. 12. The carbon cloth/gallium oxynitride has a specific discharge capacitance of 30 to 865 mF $cm^{-2}$ at a current density of 0.5 to 100 mA $cm^{-2}$.

Preferably, an XRD pattern of the carbon cloth/gallium oxynitride is featured with two relatively weak diffraction peaks at 24.2° and 43.6° from the carbon cloth, and seven relatively strong diffraction peaks at 32.5°, 34.6°, 37.1°, 48.2°, 57.9°, 63.6°, and 69.2° from the gallium oxynitride. The diffraction peaks from the gallium oxynitride correspond to the (100), (002), (101), (102), (110), (103), and (112) crystal planes of a hexagonal wurtzite GaN (JCPDS 50-0792), referring to FIG. 1.

Preferably, the carbon cloth/gallium oxynitride has lattice parameters of a (Å): 3.18-3.20, c (Å): 5.19-5.22, c/a: 1.62-1.64; and V ($Å^3$): 45.7-46.1.

Preferably, the carbon cloth/gallium oxynitride has a valence state spectrum with characteristic peaks centered at 4.8±0.1, 7.6±0.1, and 10.7±0.1 eV, which correspond separately to $Ga_{4p}$—$N_{2p}$, $Ga_{4s}$—$N_{2p}$, and $Ga_{4s}$—$O_{2p}$ hybrid orbitals. This result indicates that orbital hybridization of Ga with N and O exists in the gallium oxynitride, referring to FIG. 2.

Figure 3:
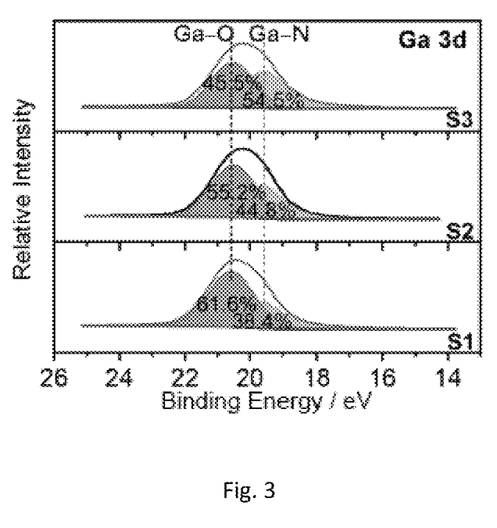
FIG. 3 is the Ga 3d XPS spectrum of the sample electrode.
Figure 4:
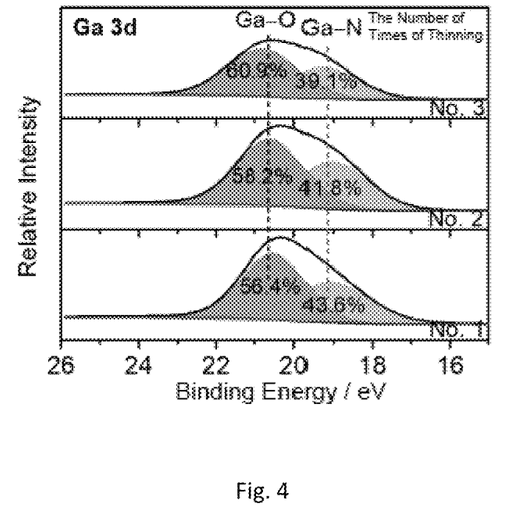
FIG. 4 is the depth Ga 3d XPS spectrum of the sample electrode.

Preferably, the carbon cloth/gallium oxynitride has a Ga 3d XPS spectrum with characteristic peaks centered at 19.6 and 20.6 eV, which correspond separately to Ga—N and Ga—O, referring to FIG. 3 and FIG. 4. Preferably, the carbon cloth/gallium oxynitride has an energy bandgap in the range of 2.9-3.3 eV confirmed by a diffuse reflectance ultraviolet-visible absorption spectrum, referring to FIG. 5 and FIG. 6.

The present disclosure further provides a preparation method for the carbon cloth/gallium oxynitride, including the following steps:

1) performing a surface treatment on a carbon cloth to obtain a carbon cloth A;
2) placing the carbon cloth A in a gallium trichloride-benzene solution, repeating dip-coating several times to obtain a carbon cloth B, placing the carbon cloth B in a fuming hood and placing in ambient air at room temperature for 6 to 12 h to obtain a carbon cloth C, and placing the carbon cloth C in an oven for drying at 50 to 70° C. for 6 to 12 h to obtain a carbon cloth D; and
3) placing the carbon cloth D in a tube furnace and nitriding it in an ammonia atmosphere to obtain the carbon cloth/gallium oxynitride.

With respect to the surface treatment performed on the carbon cloth at step 1), the surface treatment is an air plasma treatment or ultrasonic treatment, wherein the air plasma treatment is performed at a power of 90 to 110 W for 60 to 120 s; and the ultrasonic treatment is that the carbon cloth is placed in 3-8 mol $L^{-1}$ nitric acid, subjected to the ultrasonic treatment at room temperature for 1 to 3 h, and dried for use. Preferably, the acid is 5-7 mol $L^{-1}$ nitric acid. More preferably, the ultrasonic treatment is that the carbon cloth is placed in 6 mol $L^{-1}$ nitric acid, subjected to the ultrasonic treatment at room temperature for 2 h, and dried for use.

With respect to the gallium trichloride-benzene solution at step 2), gallium trichloride has a concentration of 1 to 2 mol $L^{-1}$, and benzene has an analytical purity.

With respect to the dip-coating repeated for several times at step 2), the dip-coating is repeated for 6 to 12 times with a time interval between two adjacent dip-coating of 4 to 6 min. Preferably, the time interval between adjacent dip-coating is 5 min.

Preferably, with respect to the ammonia atmosphere at step 3), a flow rate of ammonia gas is 32 to 48 mL $min^{-1}$, and the ammonia gas enters the tube furnace after flowing through a gas washing bottle containing 25-28% ammonium hydroxide.

Preferably, with respect to the nitriding at step 3), the nitriding is performed at 750 to 850° C. and a heating rate of 10° C. $min^{-1}$ for 8 to 12 h. More preferably, the nitriding is performed at 800° C. for 10 h.

The present disclosure further provides an application of the carbon cloth/gallium oxynitride in preparation of a working electrode for supercapacitors.

A working electrode is prepared by cutting a carbon cloth/gallium oxynitride strip into desired sizes, wherein the carbon cloth/gallium oxynitride has the aforementioned structure.

The present disclosure further provides an application of the carbon cloth/gallium oxynitride working electrode in assembly of a symmetrical aqueous supercapacitor.

A supercapacitor is composed of two carbon cloth/gallium oxynitride working electrodes, a separator, electrolyte, and an outer package. Preferably, the separator is a sulfonated polymer fiber membrane; and the electrolyte is an aqueous solution of sulfuric acid, lithium sulfate, or sodium sulfate. Preferably, the separator is a Shenzhen Gebang GBH5512 sulfonated separator; and preferably, the electrolyte is 1 mol $L^{-1}$ sulfuric acid.

The supercapacitor has a specific discharge capacitance of 60 to 152 mF $cm^{-2}$. The specific discharge capacitance at a current density of 100 mA $cm^{-2}$ has a capacitance retention of 41 to 46% relative to the specific discharge capacitance at 1 mA $cm^{-2}$.

The supercapacitor is a symmetrical aqueous supercapacitor.

A preparation method of the supercapacitor includes the following steps: cutting a carbon cloth/gallium oxynitride rectangular strip to prepare a working electrode, taking a $H_2SO_4$ solution as an electrolyte, cutting a separator into a round sheet, and assembling a coin-type supercapacitor.

Preferably, the preparation method of the supercapacitor includes the following steps: cutting a carbon cloth/gallium oxynitride rectangular strip into a working electrode with size of 1 cm×1 cm, taking 1 mol $L^{-1}$ $H_2SO_4$ solution as an electrolyte, cutting a Shenzhen Gebang GBH5512 sulfonated separator into a round sheet having a diameter of 19 mm, and assembling an R2032 coin-type supercapacitor.

Beneficial Effects

1. In the present disclosure, the band structure, N/O molar ratio, and particle size of gallium oxynitride in the carbon cloth/gallium oxynitride can be tuned by changing the nitridation temperature.

2. The carbon cloth/gallium oxynitride working electrode and symmetric aqueous supercapacitor provided in the present disclosure have relatively high areal specific capacitance, excellent rate capability, and high cycling stability.

3. The carbon cloth/gallium oxynitride working electrode and symmetric aqueous supercapacitor provided in the present disclosure show a typical electrochemical double-layer capacitive characteristic and an excellent rate capability. The specific discharge capacitance at the current density of 100 mA $cm^{-2}$ has a capacitance retention of 41 to 46% relative to the specific discharge capacitance at 1 mA $cm^{-2}$, showing good rate capability. After 20,000 continuous cycles at different current densities, the symmetric supercapacitor can retain the initial specific discharge capacitance.

DETAILED DESCRIPTION OF THE EMBODIMENTS

The technical solutions of the present disclosure will be further described below through specific examples in conjunction with the drawings, and these examples are merely provided for illustrating the technical solutions of the present disclosure and not construed as a limitation to the claims of the present disclosure.

Nitric acid in the examples was purchased from Tianjin Damao Chemical Reagent Co., Ltd., benzene was purchased from Sinopharm Group (Shanghai) Co., Ltd., carbon cloths were purchased from Taiwan CeTech Co., Ltd., and gallium trichloride was self-prepared by using a combustion reaction of metallic gallium and chlorine.

An air plasma treatment was performed on the carbon cloth in an SPV-5L plasma cleaner manufactured by Dongguan Sindin Precision Instrument Co., Ltd.

X-ray powder diffraction (XRD) patterns were obtained through a German Bruker D8 Advance X-ray powder diffractometer; scanning electron microscopy (SEM) images were obtained through a Japanese Hitachi Regulus 8220 field emission scanning electron microscopy; CHNO elemental analysis was obtained through a German Elementar Unicube elemental analyzer; X-ray photoelectron spectroscopy (XPS) diagrams were obtained through an American Thermo Fisher Scientific ESCALAB 250Xi X-ray photoelectron spectrometer; diffuse reflectance ultraviolet-visible absorption spectra were obtained through a Japanese Shimadzu UV-2600 diffuse reflectance ultraviolet-visible spectrophotometer; and electrochemical performance of samples was tested by a Shanghai Chenhua CHI660E electrochemical analyzer.

EXAMPLE 1

A carbon cloth/gallium oxynitride and a preparation method thereof were provided. The carbon cloth/gallium oxynitride was prepared by the following steps:

(1) a carbon cloth was placed in 6 mol $L^{-1}$ nitric acid, subjected to an ultrasonic treatment at room temperature for 2 h, and dried;

(2) the carbon cloth was cut into rectangular strips having a size of 1 cm×4 cm, and the carbon cloth strip was placed in 1 mol $L^{-1}$ gallium trichloride-benzene solution and subjected to dip-coating for 12 times with a time interval between two adjacent dip-coating of 5 min;

(3) after the dip-coating, the carbon cloth was placed in a fuming hood and placed in ambient air at room temperature for 12 h, placed in an oven for drying at 60° C. for 6 h, and placed in a tube furnace, an ammonia gas cylinder was opened, a flow rate of ammonia gas was set to be 48 mL $min^{-1}$, and the ammonia gas entered the tube furnace after flowing through 25-28% ammonium hydroxide;

(4) the temperature was programmed at a heating rate of 10° C. $min^{-1}$ and kept for 10 h when reaching 750° C.; and (5) the temperature was lowered, and the carbon cloth was cooled naturally to room temperature to obtain the carbon cloth/gallium oxynitride strips which were marked as S1.

EXAMPLE 2

The 750° C. at step (4) of Example 1 was changed to 800° C., and the rest conditions remained unchanged. The obtained carbon cloth/gallium oxynitride strips were marked as S2.

EXAMPLE 3

The 750° C. at step (4) of Example 1 was changed to 850° C., and the rest conditions remained unchanged. The obtained carbon cloth/gallium oxynitride strips were marked as S3.

Result Analysis

Figure 1:
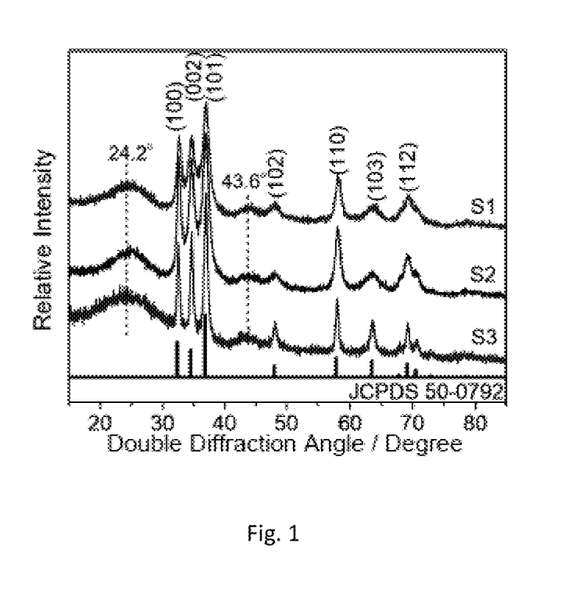
FIG. 1 is the XRD pattern of the sample electrode.

FIG. 1 shows XRD patterns of the samples S1, S2 and S3. Two weak peaks at 24.2° and 43.6° result from the carbon cloth, and the other diffraction peaks correspond to (100), (002), (101), (102), (110), (103), and (112) crystal planes of a hexagonal wurtzite GaN (JCPDS 50-0792). Compared with S1 and S2, the diffraction peaks corresponding to the (100)/(002)/(101) planes in S3 spectrum have relatively narrower widths and obvious splitting. This result indicates that the increase in nitridation temperature is beneficial to increasing the crystallinity of sample particles.

Further structural information of the samples can be obtained using Rietveld fitting. Unit cell parameters of the different samples are shown in Table 1. It can be seen from Table 1 that as the nitridation temperature increases, unit cell volumes of the samples are gradually reduced, but are all larger than that of GaN. This is arisen from gradually increasing N/O ratios of the samples S1 to S3. Theoretical calculation results show that by replacing partial N atoms in GaN with O atoms, the Ga—N bond length is elongated, and the Ga—O bond length is greater than that of the Ga—N bond. Therefore, as the nitridation temperature increases, the N/O ratio of the samples increases and, hence, the unit cell volumes become smaller.

TABLE 1

Rietveld fitting results of different samples

| Unit cell parameter | S1 | S2 | S3 | GaN (JCPDS 50-0792) |
|---|---|---|---|---|
| a (Å) | 3.193 (1) | 3.187 (7) | 3.188 (9) | 3.189 (1) |
| c (Å) | 5.218 (7) | 5.210 (1) | 5.191 (1) | 5.185 (5) |
| c/a | 1.634 | 1.634 | 1.628 | 1.626 |
| V (Å$^3$) | 46.080 | 45.848 | 45.715 | 45.671 |

CHNO elemental analysis results show that the samples S1, S2, and S3 respectively have chemical formulas of $GaO_{0.20}N_{0.81}$, $GaO_{0.20}N_{0.90}$, and $GaO_{0.20}N_{0.96}$. Thus, the samples S1, S2 and S3 respectively have N/O ratios of 4.05, 4.50, and 4.80.

Figure 2:
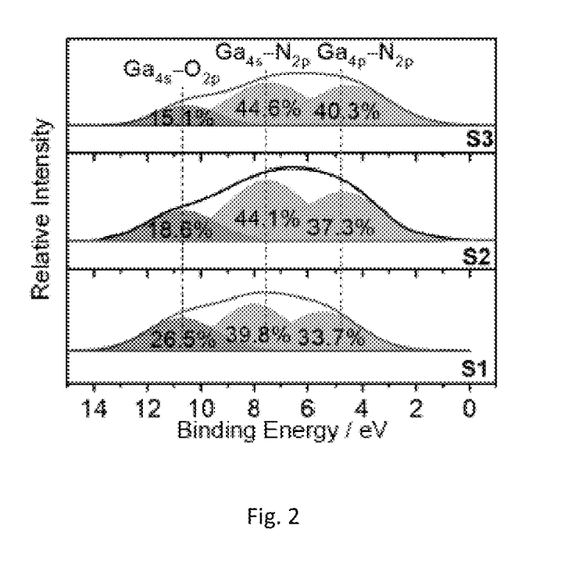
FIG. 2 is the valence state spectrum of the sample electrode.

FIG. 2 shows XPS valence state spectra of the samples. In FIG. 2, the peaks near 4.8, 7.6, and 10.7 eV respectively correspond to $Ga_{4p}$—$N_{2p}$, $Ga_{4s}$—$N_{2p}$, and $Ga_{4s}$—$O_{2p}$ hybrid orbitals. This result indicates that orbital hybridization of Ga with N and O exists in gallium oxynitride.

The hybridization of Ga with N and O is also verified by the Ga 3d spectra (FIG. 3). In FIG. 3, the peaks at 19.6 and 20.6 eV respectively correspond to Ga—N and Ga—O. Note that as the nitridation temperature increases, the content of Ga—O component of the samples gradually decreases while the content of Ga—N component gradually increases (FIGS. 2 and 3). This result indicates that the N/O ratios of the sample can be regulated by changing the nitridation temperature.

In order to further obtain the structural information of the samples, the samples are characterized by an argon ion thinning XPS technology. Argon ion thinning Ga 3d spectra (FIG. 4) show that the content of the Ga—O component gradually increases while the content of the Ga—N component gradually decreases with increasing the thinning times. The result that the contents of the Ga—O and Ga—N components present gradient changes with increasing thinning times shows that the samples S1 to S3 are gallium oxynitride samples but not a mixture of gallium oxide and gallium nitride.

Not only the unit cell parameters and the N/O molar ratios of the samples, but also energy band structures and particle morphologies of the samples can be tuned by changing the nitridation temperature.

Figure 5:
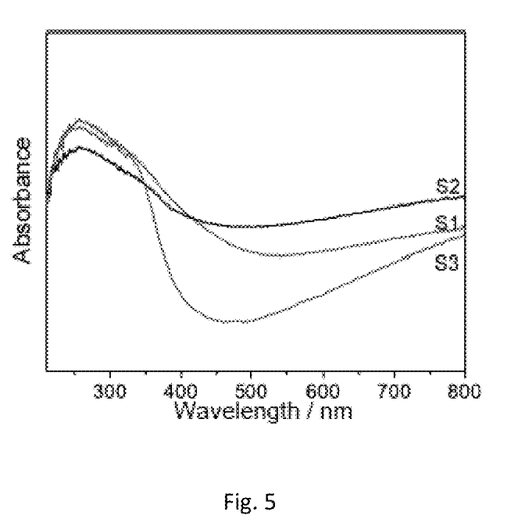
FIG. 5 is the diffuse reflectance ultraviolet-visible absorption spectrum of the sample electrode.
Figure 6:
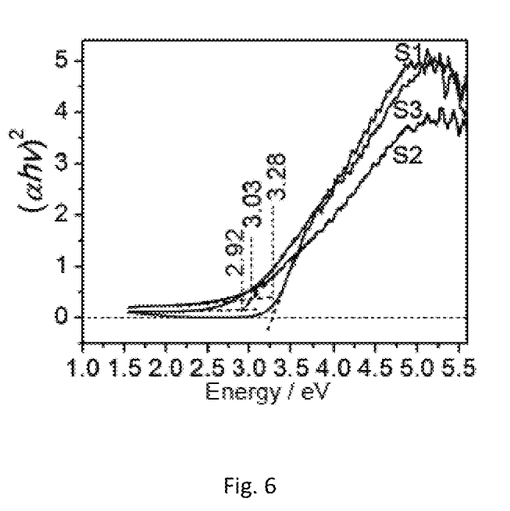
FIG. 6 is the Kubelka-Munk equation-based curve of the sample electrode.
Figure 7:
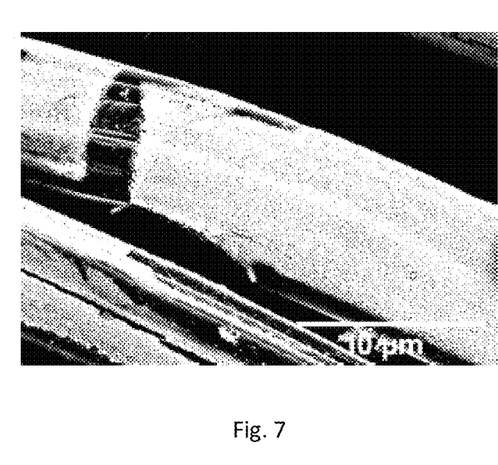
FIG. 7 is the SEM image of sample electrode S1, wherein the scale bar is 10 μm.
Figure 8:
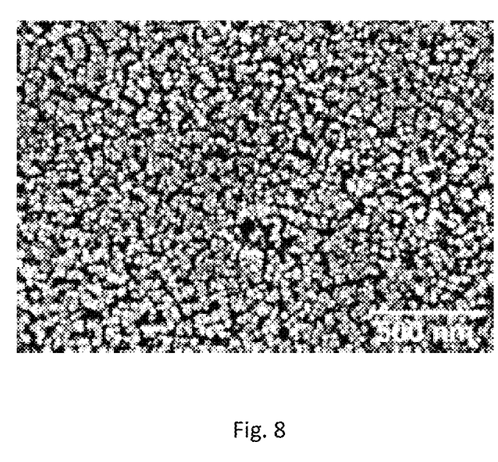
FIG. 8 is the high-magnification SEM image of sample electrode S1, wherein the scale bar is 500 nm.
Figure 9:
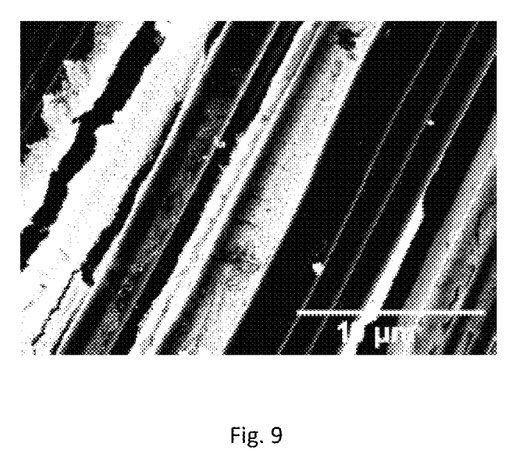
FIG. 9 is the SEM image of sample electrode S2, wherein the scale bar is 10 μm.
Figure 10:
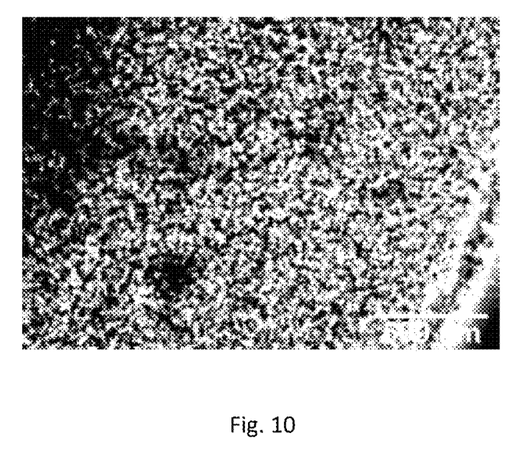
FIG. 10 the a high-magnification SEM image of sample electrode S2, wherein the scale bar is 500 nm.
Figure 11:
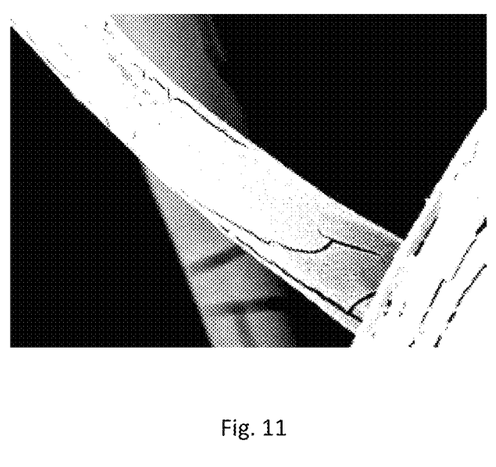
FIG. 11 is the SEM image of sample electrode S3, wherein the scale bar is 10 μm.
Figure 12:
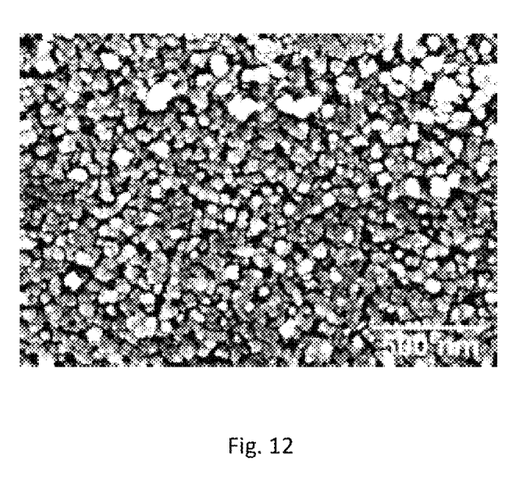
FIG. 12 is the high-magnification SEM image of sample electrode S3, wherein the scale bar is 500 nm.

FIG. 5 shows the diffuse reflectance ultraviolet-visible absorption spectra of the samples. Energy band widths (FIG. 6) of the samples can be estimated using the data of the diffuse reflectance ultraviolet-visible absorption spectra according to the Kubelka-Munk equation. It can be seen from FIG. 6 that the energy band widths of the samples S1, S2, and S3 are estimated to be 2.92, 3.03, and 3.28 eV in sequence.

FIGS. 7 to 12 are morphological images of the samples. It can be seen that gallium oxynitride nanoparticles reside on the carbon cloth fibers. Gallium oxynitride nanoparticles of sample S1 have a size range of 20 to 40 nm (FIG. 8), gallium oxynitride nanoparticles of sample S2 have a size range of 10 to 25 nm (FIG. 10), and gallium oxynitride nanoparticles of sample S3 have a size range of 40 to 70 nm (FIG. 12) and the particle surface of S3 is pulverized into finer nanoparticles.

EXAMPLE 4

A carbon cloth/gallium oxynitride working electrode and its electrochemical performance were provided. The carbon cloth/gallium oxynitride working electrode was prepared by the following steps:

the rectangular strip sample S1 was cut into an electrode sheet having a size of 1 cm×1 cm, the electrode sheet was fixed on a working electrode clamp. Cyclic voltammograms, galvanostatic charge-discharge curves, and cycling stability of the electrode sheet were respectively tested by taking $Hg/Hg_2SO_4$ as a reference electrode, a platinum sheet having a size of 1.5 cm×1.5 cm as a counter electrode, and 1 mol $L^{-1}$ $H_2SO_4$ as the electrolyte.

Those skilled in the art may set the size of the electrode sheet as needed, so the size of the electrode sheet is not limited to 1 cm×1 cm.

EXAMPLE 5

S1 of Example 4 was changed to S2, and the rest remained unchanged.

EXAMPLE 6

S1 of Example 4 was changed to S3, and the rest remained unchanged.

EXAMPLE 7

The 1 mol $L^{-1}$ $H_2SO_4$ of Example 4 was changed to 1 mol $L^{-1}$ $Na_2SO_4$, and the rest remained unchanged.

Result Analysis

Figure 13:
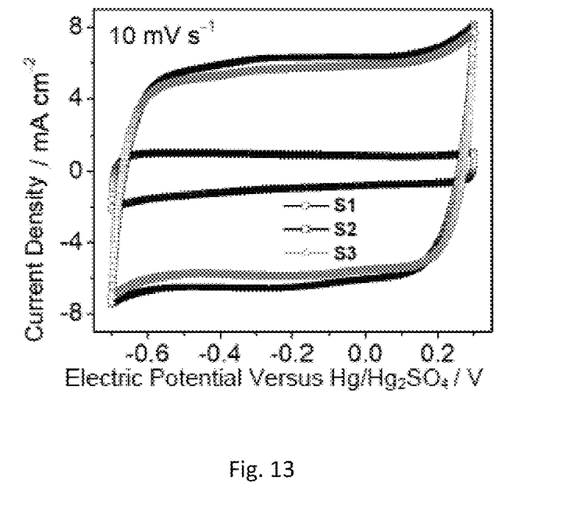
FIG. 13 is the cyclic voltammograms of the sample electrodes scanned at 10 mV $s^{-1}$, using 1 mol $L^{-1}$ $H_2SO_4$ as the electrolyte.

FIG. 13 to FIG. 16 show the electrochemical performance of the samples tested by taking 1 mol $L^{-1}$ $H_2SO_4$ as the electrolyte. FIG. 13 shows the cyclic voltammograms of the samples at a scan rate of 10 mV $s^{-1}$. It can be seen from FIG. 13 that the cyclic voltammograms are nearly regular rectangles, presenting relatively typical electrochemical double-layer capacitive energy storage characteristics.

Figure 14:
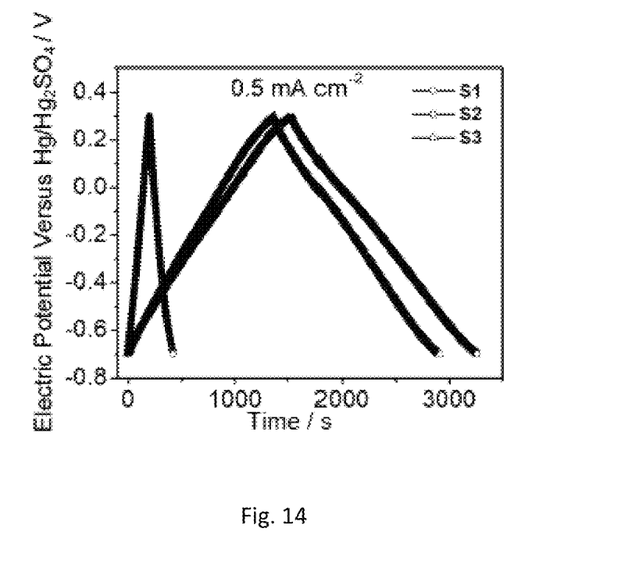
FIG. 14 is the galvanostatic charge-discharge curves of the sample electrodes at 0.5 mA $cm^{-2}$, using 1 mol $L^{-1}$ $H_2SO_4$ as the electrolyte.
Figure 15:
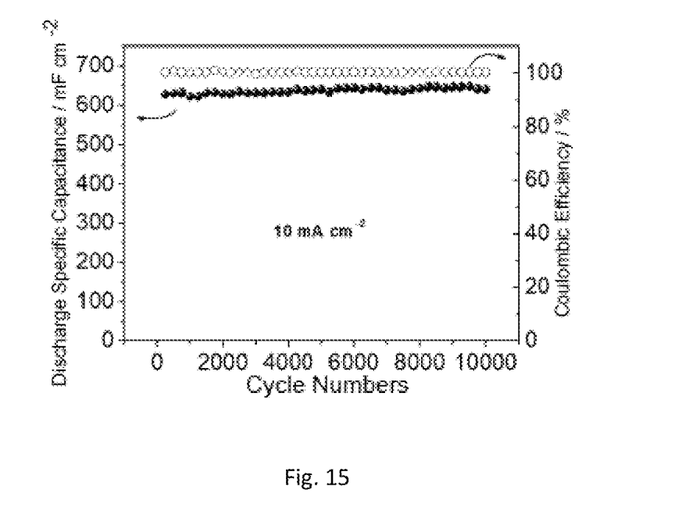
FIG. 15 is the cycling curve and corresponding Coulomb efficiency of the sample electrode S2 at 10 mA $cm^{-2}$, using 1 mol $L^{-1}$ $H_2SO_4$ as the electrolyte.

FIG. 14 shows the galvanostatic charge-discharge curves of the samples at a current density of 0.5 mA $cm^{-2}$. It can be calculated from FIG. 14 that samples S1, S2, and S3 respectively manifest discharge specific areal capacitance of 114, 863, and 766 mF $cm^{-2}$.

The sample S2 not only has a higher specific areal capacitance at the same current density, but also has a better rate capability (Table 2). At a current density of 100 mA $cm^{-2}$, a specific areal capacitance of sample S2 reaches 285 mF $cm^{-2}$, which was much higher than 30 mF $cm^{-2}$ of sample S1 and 120 mF $cm^{-2}$ of sample S3. After 10,000 cycles at 10 mA $cm^{-2}$, sample S2 has a nearly 100% capacitance retention and a nearly 100% Coulomb efficiency (FIG. 15) during cycling, showing excellent electrochemical performance.

Figure 16:
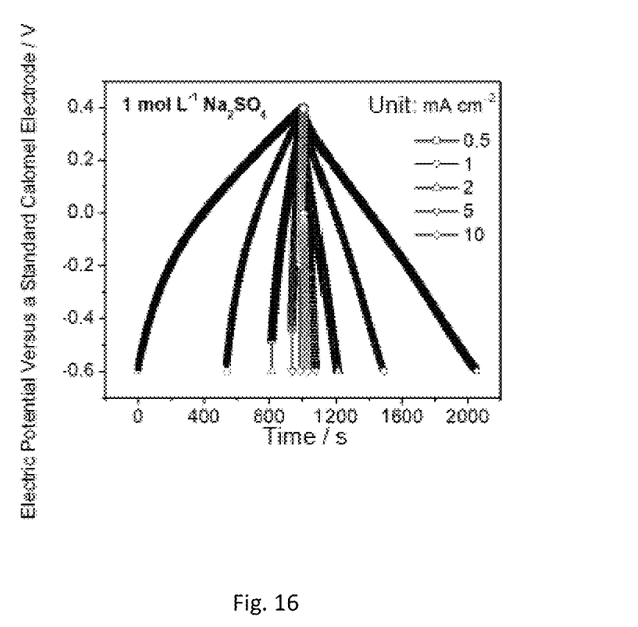
FIG. 16 is the galvanostatic charge-discharge curve of the sample electrode S2 at different current densities, using 1 mol $L^{-1}$ $Na_2SO_4$ as the electrolyte.

FIG. 16 shows the galvanostatic charge-discharge curves of sample S2 at different current densities tested by taking 1 mol $L^{-1}$ $Na_2SO_4$ as the electrolyte. It can be seen from FIG. 16 that S2 still shows good electrochemical performance in the electrolyte of 1 mol $L^{-1}$ $Na_2SO_4$. The discharge specific capacitance values of S2 at current densities of 0.5, 1, 2, 5, and 10 mA $cm^{-2}$ are respectively 524, 477, 394, 345, and 220 mF $cm^{-2}$.

EXAMPLE 8

A carbon cloth/gallium oxynitride and a preparation method thereof were provided. The carbon cloth/gallium oxynitride was prepared by the following steps:

(1) a carbon cloth was placed in 6 mol $L^{-1}$ nitric acid, subjected to an ultrasonic treatment at room temperature for 2 h, and dried;

(2) the carbon cloth was cut into a rectangular strip having a size of 1 cm×4 cm, and the carbon cloth strip was placed in 2 mol $L^{-1}$ gallium trichloride-benzene solution and subjected to dip-coating for 6 times with a time interval between two adjacent dip-coating of 4 min;

(3) after the dip-coating, the carbon cloth was placed in a fuming hood and placed in ambient air at room temperature for 6 h, placed in an oven for drying at 50° C. for 12 h, and placed in a tube furnace, an ammonia gas cylinder was opened, a flow rate of ammonia gas was set to be 32 mL $min^{-1}$, and the ammonia gas entered the tube furnace after flowing through 25-28% ammonium hydroxide;

(4) the temperature was programmed at a heating rate of 10° C. $min^{-1}$ and kept for 12 h when reaching 800° C.; and (5) the temperature was lowered, and the carbon cloth was cooled naturally to room temperature to obtain a carbon cloth/gallium oxynitride which is marked as S4.

The discharge specific capacitance values of sample S4 at different current densities tested by electrochemical analysis are shown in Table 2.

TABLE 2

Specific discharge capacitance of samples S1 to S5 at different current densities

| Sample | Specific capacities at different current densities (mF cm$^{-2}$) | | | | | | | |
|---|---|---|---|---|---|---|---|---|
| | 0.5 mA cm$^{-2}$ | 1 mA cm$^{-2}$ | 2 mA cm$^{-2}$ | 5 mA cm$^{-2}$ | 10 mA cm$^{-2}$ | 20 mA cm$^{-2}$ | 50 mA cm$^{-2}$ | 100 mA cm$^{-2}$ |
| S1 | 114 | 101 | 93 | 85 | 78 | 70 | 55 | 30 |
| S2 | 863 | 797 | 747 | 684 | 625 | 544 | 395 | 285 |
| S3 | 766 | 709 | 661 | 608 | 558 | 490 | 345 | 120 |
| S4 | 578 | 565 | 509 | 471 | 437 | 392 | 305 | 170 |
| S5 | 801 | 751 | 693 | 623 | 557 | 462 | 384 | 245 |

EXAMPLE 9

An electrode material for carbon cloth/gallium oxynitride supercapacitors and a preparation thereof were provided. The electrode material for carbon cloth/gallium oxynitride-based supercapacitors was prepared by the following steps:
(1) a carbon cloth was subjected to an air plasma treatment at a power of 100 W for 60 s;
(2) the carbon cloth was cut into a rectangular strip having a size of 1 cm×4 cm, and the carbon cloth strip was placed in 1 mol L$^{-1}$ gallium trichloride-benzene solution and subjected to dip-coating for 10 times with a time interval between two adjacent dip-coating of 6 min;
(3) after the dip-coating, the carbon cloth was placed in a fuming hood and placed in ambient air at room temperature for 8 h, placed in an oven for drying at 70° C. for 10 h, and placed in a tube furnace, an ammonia gas cylinder was opened, a flow rate of ammonia gas was set to be 40 mL min$^{-1}$, and the ammonia gas entered the tube furnace after flowing through 25-28% ammonium hydroxide;
(4) the temperature was programmed at a heating rate of 10° C. min$^{-1}$ and kept for 8 h when reaching 800° C.; and
(5) the temperature was lowered, and the carbon cloth was cooled naturally to room temperature to obtain a carbon cloth/gallium oxynitride which was marked as S5.

The discharge specific capacitance values of sample S5 at different current densities tested by electrochemical analysis are shown in Table 2.

It can be seen from Table 2 that no matter the carbon cloth was subjected to an acid treatment or an air plasma treatment, a carbon cloth/gallium oxynitride with excellent electrochemical performance can be obtained at 800° C. by using an ammonia water-assisted nitridation method.

EXAMPLE 10

A carbon cloth/gallium oxynitride-based symmetric aqueous supercapacitor and the electrochemical performance were provided. The carbon cloth/gallium oxynitride-based symmetric aqueous supercapacitor was prepared by the following steps:

the rectangular strip sample S2 was cut into an electrode sheet having a size of 1 cm×1 cm to prepare a working electrode, 1 mol L$^{-1}$ H$_2$SO$_4$ was taken as the electrolyte, a Shenzhen Gegang GBH5512 sulfonated separator was cut into a round sheet with a diameter of 19 mm, and an R2032 coin-type supercapacitor device D1 was assembled. The cyclic voltammograms, galvanostatic charge-discharge curves, and cycling stability of the device D1 were respectively tested.

EXAMPLE 11

A carbon cloth/gallium oxynitride-based symmetric aqueous supercapacitor and the electrochemical performance thereof were provided. The carbon cloth/gallium oxynitride-based symmetric aqueous supercapacitor was prepared by the following steps:

the rectangular strip sample S5 was cut into an electrode sheet having a size of 1 cm×1 cm to prepare a working electrode, 1 mol L$^{-1}$ H$_2$SO$_4$ was taken as the electrolyte, a Shenzhen Gegang GBH5512 sulfonated separator was cut into a round sheet with a diameter of 19 mm, and an R2032 coin-type supercapacitor device D2 was assembled. The cyclic voltammograms, galvanostatic charge-discharge curves, and cycling stability of the device D2 were respectively tested.

Result Analysis

Figure 17:
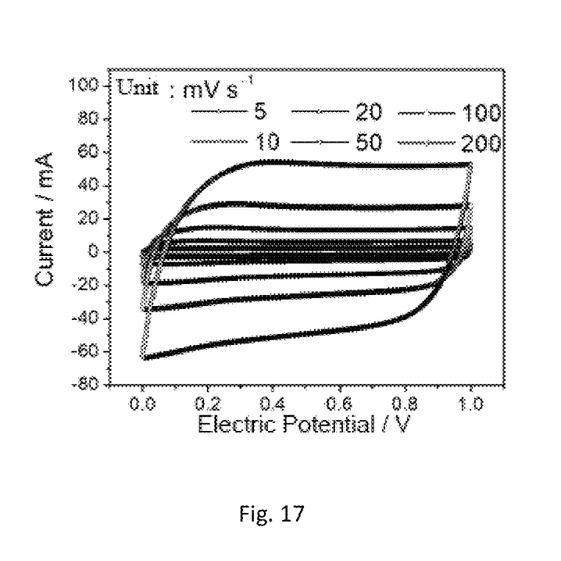
FIG. 17 is the cyclic voltammograms of the supercapacitor device D1, using 1 mol $L^{-1}$ $H_2SO_4$ as the electrolyte.

FIG. 17 shows the cyclic voltammograms of the supercapacitor device D1. Even at a scan rate of 200 mV s$^{-1}$, the cyclic voltammograms of the device still can remain a relatively regular rectangle. This result indicates that the carbon cloth/gallium oxynitride-based symmetric aqueous supercapacitor presents typical electrochemical double-layer capacitive characteristics and good rate capability.

Figure 18:
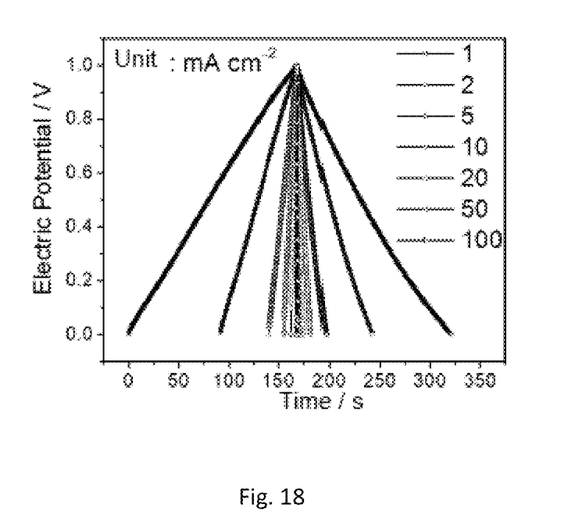
FIG. 18 is the galvanostatic charge-discharge curves of the supercapacitor device D1, using 1 mol $L^{-1}$ $H_2SO_4$ as the electrolyte.

FIG. 18 shows the galvanostatic charge-discharge curves of the supercapacitor device D1. It can be seen from FIG. 18 that the discharge specific capacitance values at current densities of 1, 2, 5, 10, 20, 50, and 100 mA cm$^{-2}$ are respectively 152, 148, 139, 132, 122, 95, and 70 mF cm$^{-2}$ (Table 3). The discharge specific capacitance of the supercapacitor device D1 at the current density of 100 mA cm$^{-2}$ has a capacitance retention of 46% relative to the discharge specific capacitance at 1 mA cm$^{-2}$, showing good rate capability.

Figure 19:
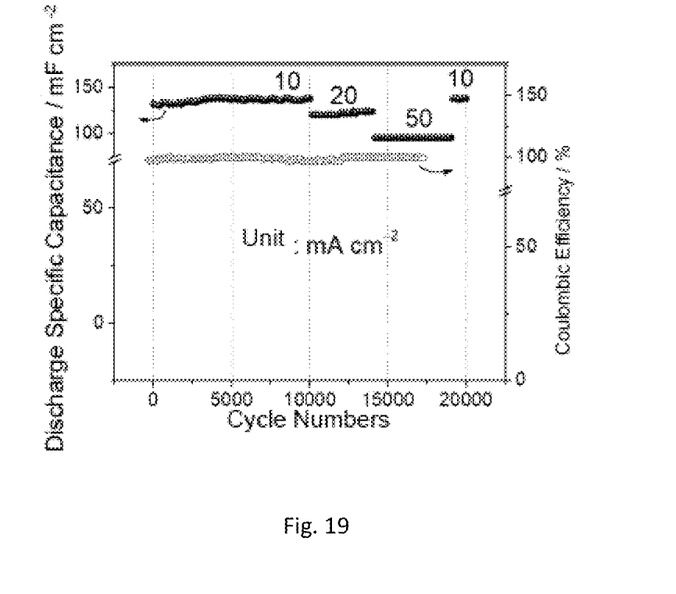
FIG. 19 is the diagram of cycling performance of the supercapacitor device D1 at different current densities, using 1 mol $L^{-1}$ $H_2SO_4$ as the electrolyte.

FIG. 19 shows the cycling performance of the device D1 at different current densities. It can be seen from FIG. 19, after 20,000 continuous cycles at different current densities of 10, 20, 50, and 10 mA cm$^{-2}$, the device still can retain the initial discharge specific capacitance.

The discharge specific capacitance values of the supercapacitor devices D1 and D2 at different current densities are shown in Table 3. The discharge specific capacitance of the supercapacitor device D2 at a current density of 100 mA cm$^{-2}$ has a capacitance retention of 41% relative to the discharge specific capacitance at 1 mA cm$^{-2}$.

TABLE 3

Discharge specific capacitance of supercapacitor devices at different current densities

| Device | Specific capacities at different current densities (mF cm$^{-2}$) | | | | | | |
|---|---|---|---|---|---|---|---|
| | 1 mA cm$^{-2}$ | 2 mA cm$^{-2}$ | 5 mA cm$^{-2}$ | 10 mA cm$^{-2}$ | 20 mA cm$^{-2}$ | 50 mA cm$^{-2}$ | 100 mA cm$^{-2}$ |
| D1 | 152 | 148 | 139 | 132 | 122 | 95 | 70 |
| D2 | 145 | 140 | 131 | 124 | 111 | 91 | 60 |

The results in FIGS. 17 to 19 and Table 3 show that the carbon cloth/gallium oxynitride-based symmetric aqueous supercapacitors have excellent electrochemical performance.

What is claimed is:

1. A carbon cloth/gallium oxynitride having a chemical formula of GaO$_x$N$_y$, wherein x=0.1-0.3 and y=0.7-0.9, the carbon cloth/gallium oxynitride has a N/O molar ratio of 2.3 to 9.

2. The carbon cloth/gallium oxynitride according to claim 1, wherein the carbon cloth/gallium oxynitride has discharge specific capacitance of 30 to 865 mF cm$^{-2}$ at current densities ranging from 0.5 to 100 mA cm$^{-2}$.

3. The carbon cloth/gallium oxynitride according to claim 1, wherein the carbon cloth/gallium oxynitride is a composite formed by loading gallium oxynitride nanoparticles on carbon cloth fibers, and the gallium oxynitride nanoparticles have a size range of 10 to 70 nm.

4. The carbon cloth/gallium oxynitride according to claim 3, wherein an XRD pattern of the carbon cloth/gallium oxynitride exhibits two relatively weak diffraction peaks at 24.2° and 43.6° from the carbon cloth, and seven relatively strong diffraction peaks at 32.5°, 34.6°, 37.1°, 48.2°, 57.9°, 63.6°, and 69.2° from the gallium oxynitride, and the diffraction peaks from the gallium oxynitride correspond to (100), (002), (101), (102), (110), (103) and (112) crystal planes of a hexagonal wurtzite GaN (JCPDS 50-0792).

5. The carbon cloth/gallium oxynitride according to claim 3, wherein the carbon cloth/gallium oxynitride has unit cell parameters of a (Å): 3.18-3.20, c (Å): 5.19-5.22, c/a: 1.62-1.64; and V (Å$^3$): 45.7-46.1.

6. The carbon cloth/gallium oxynitride according to claim 3, wherein the carbon cloth/gallium oxynitride has a valence state spectrum having characteristic peaks at ca 4.8, 7.6, and 10.7 eV;
the carbon cloth/gallium oxynitride has a Ga 3d spectrum having characteristic peaks at 19.6 and 20.6 eV; and
the carbon cloth/gallium oxynitride has an energy band width of 2.9 to 3.3 eV according to the diffuse reflectance ultraviolet-visible absorption spectrum.

7. A preparation method of the carbon cloth/gallium oxynitride according to claim 1 comprising the following steps:
1) Performing a surface treatment on a carbon cloth to obtain a carbon cloth A;
2) Placing the carbon cloth A in a gallium trichloride-benzene solution, repeating dip-coating for several times to obtain a carbon cloth B, placing the carbon cloth B in a fuming hood and placing in ambient air at room temperature for 6 to 12 h to obtain a carbon cloth C, and placing the carbon cloth C in an oven for drying at 50 to 70° C. for 6 to 12 h to obtain a carbon cloth D; and
3) Placing the carbon cloth D in a tube furnace and then nitriding it in an ammonia atmosphere to obtain the carbon cloth/gallium oxynitride.

8. The preparation method according to claim 7, wherein with respect to the surface treatment performed on the carbon cloth at step 1), the surface treatment is an air plasma treatment or ultrasonic treatment, wherein the air plasma treatment is performed at a power of 90 to 110 W for 60 to 120 s; and the ultrasonic treatment is that the carbon cloth is placed in 3-8 mol L$^{-1}$ nitric acid, subjected to the ultrasonic treatment at room temperature for 1 to 3 h, and dried for use; preferably, the acid is 5-7 mol L$^{-1}$ nitric acid; more preferably, the ultrasonic treatment is that the carbon cloth is placed in 6 mol L$^{-1}$ nitric acid, subjected to the ultrasonic treatment at room temperature for 2 h, and dried for use.

9. The preparation method according to claim 8, wherein with respect to the gallium trichloride-benzene solution at step 2), gallium trichloride has a concentration of 1 to 2 mol L$^{-1}$; and
with respect to the dip-coating repeated for several times at step 2), the dip-coating is repeated for 6 to 12 times with a time interval between two adjacent dip-coating of 4 to 6 min.

10. The preparation method according to claim 8, wherein with respect to the ammonia atmosphere at step 3), a flow rate of ammonia gas is 32 to 48 mL min$^{-1}$, and the ammonia gas enters the tube furnace after flowing through a gas washing bottle containing 25-28% ammonium hydroxide; and
with respect to the nitridation at step 3), the nitridation is performed at 750 to 850° C. with a heating rate of 10° C. min$^{-1}$, and the nitriding time is 8 to 12 h.

11. A working electrode is made from the carbon cloth/gallium oxynitride according to claim 1.

12. The working electrode according to claim 11 is an assembly of symmetric aqueous supercapacitors.

13. The working electrode according to claim 11 wherein a supercapacitor, composed of the carbon cloth/gallium oxynitride working electrode, a separator, electrolyte, and an outer package.

14. The working electrode according to claim 13, wherein the separator is a sulfonated polymer fiber membrane; and the electrolyte is sulfuric acid aqueous solution, lithium sulfate aqueous solution, or sodium sulfate aqueous solution.

15. The working electrode according to claim 13, wherein the separator is a Shenzhen Gebang GBH5512 sulfonated separator; and preferably, the electrolyte is 1 mol L$^{-1}$ sulfuric acid; and
the supercapacitor has the discharge specific capacitance of 60 to 152 mF cm$^{-2}$; the discharge specific capacitance at a current density of 100 mA cm$^{-2}$ has capacitance retention of 41 to 46% relative to the discharge specific capacitance at 1 mA cm$^{-2}$.

16. The working electrode according to claim 11, wherein the working electrode is prepared by the following steps:
1) Performing a surface treatment on a carbon cloth to obtain a carbon cloth A;
2) Placing the carbon cloth A in a gallium trichloride-benzene solution, repeating dip-coating for several times to obtain a carbon cloth B, placing the carbon cloth B in a fuming hood and placing in ambient air at room temperature for 6 to 12 h to obtain a carbon cloth C, and placing the carbon cloth C in an oven for drying at 50 to 70° C. for 6 to 12 h to obtain a carbon cloth D;
3) Placing the carbon cloth D in a tube furnace and nitriding it in an ammonia atmosphere to obtain a carbon cloth/gallium oxynitride; and
4) Cutting the obtained carbon cloth/gallium oxynitride strips to prepare the carbon cloth/gallium oxynitride working electrode.

17. The working electrode according to claim 16, wherein with respect to the surface treatment performed on the carbon cloth at step 1), the surface treatment is an air plasma treatment or ultrasonic treatment, wherein the air plasma treatment is performed at a power of 90 to 110 W for 60 to 120 s; and the ultrasonic treatment is that the carbon cloth is placed in 3-8 mol $L^{-1}$ nitric acid, subjected to the ultrasonic treatment at room temperature for 1 to 3 h, and dried for use. Preferably, the acid is 5-7 mol $L^{-1}$ nitric acid. More preferably, the ultrasonic treatment is that the carbon cloth is placed in 6 mol $L^{-1}$ nitric acid, subjected to the ultrasonic treatment at room temperature for 2 h, and dried for use;

with respect to the gallium trichloride-benzene solution at step 2), gallium trichloride has a concentration of 1 to 2 mol $L^{-1}$; and with respect to the dip-coating repeated for several times at step 2), the dip-coating is repeated for 6 to 12 times with a time interval between two adjacent dip-coating of 4 to 6 min. Preferably, the time interval between adjacent dip-coating is 5 min.

18. The working electrode according to claim 16, wherein with respect to the ammonia atmosphere at step 3), a flow rate of ammonia gas is 32 to 48 mL $min^{-1}$, and the ammonia gas enters the tube furnace after flowing through a gas washing bottle containing 25-28% ammonium hydroxide; and with respect to the nitriding at step 3), the nitriding is performed at 750 to 850° C. with a heating rate of 10° C. $min^{-1}$ for 8 to 12 h. More preferably, the nitriding is performed at 800° C. for 10 h.

19. The working electrode according to claim 13, wherein the supercapacitor is prepared by the following steps: cutting a carbon cloth/gallium oxynitride rectangular strip into an electrode sheet to prepare a working electrode, taking a $H_2SO_4$ solution as an electrolyte, cutting a separator into a round sheet, and assembling a coin-type supercapacitor.

20. The carbon cloth/gallium oxynitride according to claim 1, wherein the carbon cloth/gallium oxynitride has a N/O molar ratio of 4 to 5.

* * * * *